United States Patent
Ichikawa et al.

(10) Patent No.: US 6,747,934 B2
(45) Date of Patent: Jun. 8, 2004

(54) INFORMATION RECORDING/REPRODUCING APPARATUS HAVING VERIFY CONTROL FOR RECORDING

(75) Inventors: Norimoto Ichikawa, Fujisawa (JP);
Hiroyuki Minemura, Kokubunji (JP);
Toshimitsu Kaku, Sagamihara (JP);
Hisataka Sugiyama, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/315,094

(22) Filed: Dec. 10, 2002

(65) Prior Publication Data

US 2003/0063538 A1 Apr. 3, 2003

Related U.S. Application Data

(63) Continuation of application No. 09/968,969, filed on Oct. 3, 2001, now Pat. No. 6,496,461, which is a continuation of application No. 09/291,280, filed on Apr. 14, 1999, now Pat. No. 6,301,211.

(30) Foreign Application Priority Data

Apr. 14, 1998 (JP) .......................................... 10-102391

(51) Int. Cl.[7] ................................................ G11B 7/00
(52) U.S. Cl. .................................. 369/53.35; 369/53.15
(58) Field of Search ........................... 369/47.1, 47.33, 369/47.34, 53.15, 59.25, 53.35

(56) References Cited

U.S. PATENT DOCUMENTS

| 5,602,814 | A | | 2/1997 | Jaquette et al. | |
|---|---|---|---|---|---|
| 5,617,394 | A | * | 4/1997 | Sanada | ........................ 369/58 |

FOREIGN PATENT DOCUMENTS

| JP | 2-172069 | * | 7/1990 | .................. 369/58 |
|---|---|---|---|---|

* cited by examiner

*Primary Examiner*—Nabil Hindi
(74) *Attorney, Agent, or Firm*—Antonelli, Terry, Stout & Kraus, LLP

(57) ABSTRACT

An information recording/reproducing apparatus for recording information by recording information of a plurality of sectors as one recording unit into an optical information recording medium. A recording area of the optical information recording medium including a plurality of zones, wherein each zone is different in a sector number per round of a track having recording means for recording information of a plurality of sectors over a plurality of zones into the optical information recording medium, and conducting means for conducting a verify control. The recording and a timing of the conduction of the verify control are determined for each zone when the information of a plurality of sectors is to be recorded over the plurality of zones when the zone is changed over during the recording.

2 Claims, 14 Drawing Sheets

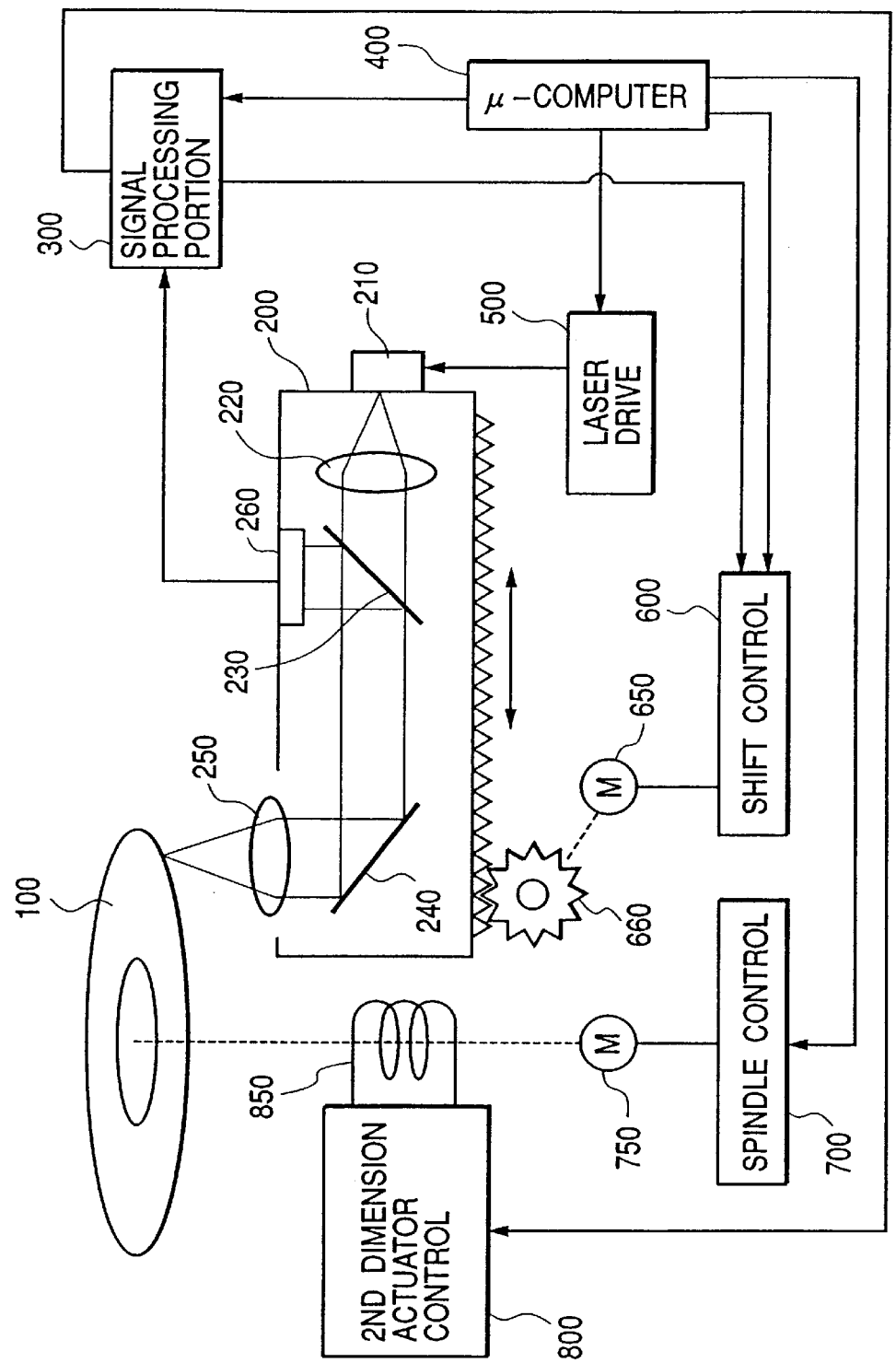

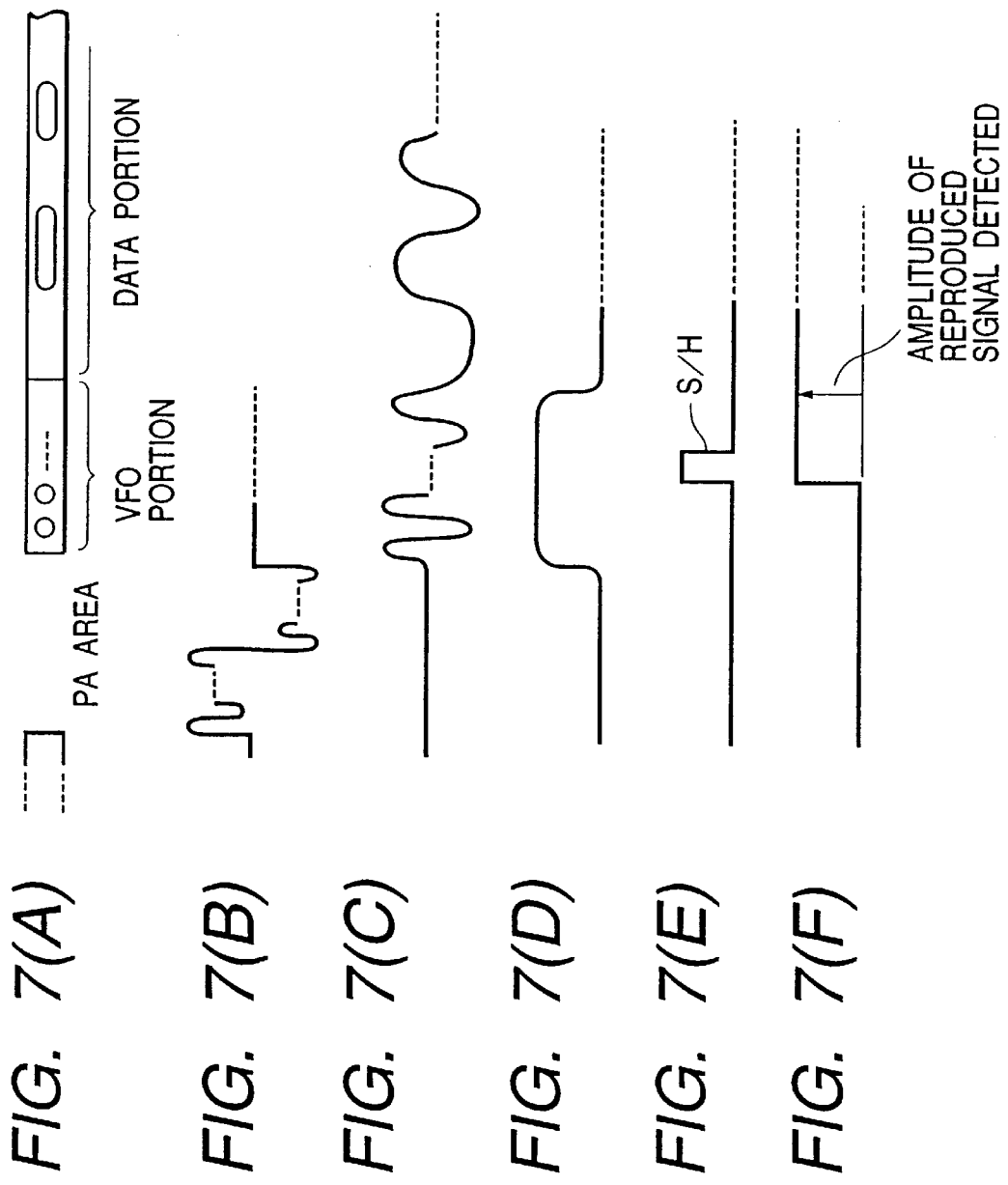

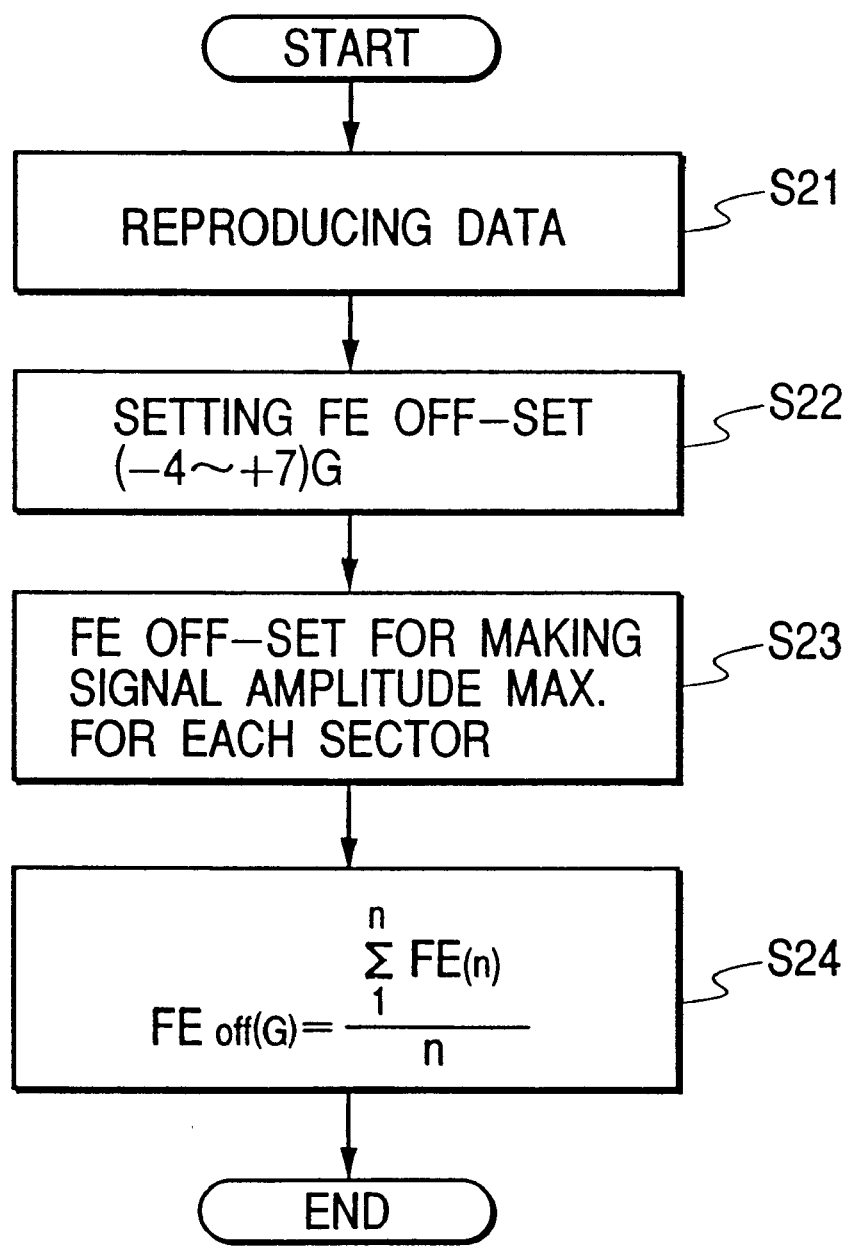

FIG. 16

| ZONE # | t (SECTOR) | r=1 n | r=1 x/r | r=2 n | r=2 x/r | r=3 n | r=3 x/r | r=4 n | r=4 x/r | r=5 n | r=5 x/r | r=6 n | r=6 x/r | r=7 n | r=7 x/r | r=8 n | r=8 x/r |
|---|---|---|---|---|---|---|---|---|---|---|---|---|---|---|---|---|---|
| 0 | 17 | 1 | 0.00 | 2 | 0.00 | 3 | 0.00 | 4 | 0.00 | 5 | 0.00 | 6 | 0.00 | 7 | 0.00 | 8 | 0.00 |
| 1 | 18 | 1 | 1.00 | 2 | 1.00 | 3 | 1.00 | 4 | 1.00 | 5 | 1.00 | 6 | 1.00 | 7 | 1.00 | 8 | 1.00 |
| 2 | 19 | 1 | 2.00 | 2 | 2.00 | 3 | 2.00 | 4 | 2.00 | 5 | 2.00 | 6 | 2.00 | 7 | 2.00 | 8 | 2.00 |
| 3 | 20 | 1 | 3.00 | 2 | 3.00 | 3 | 3.00 | 4 | 3.00 | 5 | 3.00 | 6 | 3.00 | 6 | 0.29 | 7 | 0.63 |
| 4 | 21 | 1 | 4.00 | 2 | 4.00 | 3 | 4.00 | 4 | 4.00 | 4 | 0.00 | 6 | 0.67 | 6 | 1.11 | 7 | 1.50 |
| 5 | 22 | 1 | 5.00 | 2 | 5.00 | 3 | 5.00 | 4 | 5.00 | 4 | 0.80 | 5 | 1.50 | 6 | 2.00 | 7 | 2.38 |
| 6 | 23 | 1 | 6.00 | 2 | 6.00 | 3 | 6.00 | 3 | 0.60 | 4 | 1.60 | 5 | 2.33 | 6 | 2.86 | 6 | 0.50 |
| 7 | 24 | 1 | 7.00 | 2 | 7.00 | 3 | 7.00 | 3 | 1.25 | 4 | 2.40 | 5 | 3.17 | 5 | 0.43 | 6 | 1.25 |
| 8 | 25 | 1 | 8.00 | 2 | 8.00 | 2 | 0.00 | 3 | 2.00 | 4 | 3.20 | 4 | 0.00 | 5 | 1.14 | 6 | 2.00 |
| 9 | 26 | 1 | 9.00 | 2 | 9.00 | 2 | 0.67 | 3 | 2.75 | 4 | 4.00 | 4 | 0.67 | 5 | 1.86 | 6 | 2.75 |
| 10 | 27 | 1 | 10.0 | 2 | 10.0 | 2 | 1.33 | 3 | 3.50 | 4 | 4.80 | 4 | 1.83 | 5 | 2.57 | 5 | 0.25 |
| 11 | 28 | 1 | 11.0 | 2 | 11.0 | 2 | 2.00 | 3 | 4.25 | 3 | 0.20 | 4 | 2.00 | 5 | 3.29 | 5 | 0.88 |
| 12 | 29 | 1 | 12.0 | 2 | 12.0 | 2 | 2.67 | 3 | 5.00 | 3 | 0.80 | 4 | 2.67 | 4 | 0.00 | 5 | 1.50 |
| 13 | 30 | 1 | 13.0 | 2 | 13.0 | 2 | 3.33 | 3 | 6.75 | 3 | 1.40 | 4 | 3.33 | 4 | 0.57 | 5 | 2.13 |
| 14 | 31 | 1 | 14.0 | 2 | 14.0 | 2 | 4.00 | 3 | 6.50 | 3 | 2.00 | 4 | 4.00 | 4 | 1.14 | 5 | 2.75 |
| 15 | 32 | 1 | 15.0 | 2 | 15.0 | 2 | 4.67 | 3 | 7.25 | 3 | 2.60 | 4 | 4.67 | 4 | 1.71 | 5 | 3.38 |
| 16 | 33 | 1 | 16.0 | 1 | 0.00 | 2 | 5.33 | 2 | 0.00 | 3 | 3.20 | 3 | 0.00 | 4 | 2.29 | 4 | 0.00 |
| 17 | 34 | 1 | 17.0 | 1 | 0.50 | 2 | 6.00 | 2 | 0.50 | 3 | 3.80 | 3 | 0.50 | 4 | 2.86 | 4 | 0.50 |
| 18 | 35 | 1 | 18.0 | 1 | 1.00 | 2 | 6.67 | 2 | 1.00 | 3 | 4.40 | 3 | 1.00 | 4 | 3.43 | 4 | 1.00 |
| 19 | 36 | 1 | 19.0 | 1 | 1.50 | 2 | 7.88 | 2 | 1.50 | 3 | 5.00 | 3 | 1.50 | 4 | 4.00 | 4 | 1.50 |
| 20 | 37 | 1 | 20.0 | 1 | 2.00 | 2 | 8.00 | 2 | 2.00 | 3 | 5.60 | 3 | 2.00 | 4 | 4.57 | 4 | 2.00 |
| 21 | 38 | 1 | 21.0 | 1 | 2.50 | 2 | 8.67 | 2 | 2.50 | 3 | 6.20 | 3 | 2.50 | 4 | 5.14 | 4 | 2.50 |
| 22 | 39 | 1 | 22.0 | 1 | 3.00 | 2 | 9.33 | 2 | 3.00 | 3 | 6.80 | 3 | 3.00 | 3 | 0.29 | 4 | 3.00 |
| 23 | 40 | 1 | 23.0 | 1 | 3.50 | 2 | 10.0 | 2 | 3.50 | 3 | 7.40 | 3 | 3.50 | 3 | 0.71 | 4 | 3.50 |

INFORMATION RECORDING/REPRODUCING APPARATUS HAVING VERIFY CONTROL FOR RECORDING

CROSS REFERENCE TO RELATED APPLICATION

This is a continuation of U.S. application Ser. No. 09/968,969, filed Oct. 3, 2001, now U.S. Pat. No. 6,496,461, which is a continuation of U.S. application Ser. No. 09/291,280, filed Apr. 14, 1999, now U.S. Pat. No. 6,301,211, the subject matter of which is incorporated by reference herein.

BACKGROUND OF THE INVENTION

1. Field of the Invention

The present invention relates to a reproducing apparatus of an optical information recording medium for reproducing recorded information from the optical information recording medium in which the information is recorded on a disc-like medium with pits or the like, or a recording/reproducing apparatus being further is possible to record information (hereinafter, it is called only by a recording/reproducing apparatus of an optical information medium), and in particular to an information recording/reproducing apparatus being able to record the information of a plurality of sectors as one recording unit onto the optical information recording medium, in which recording area is formed with a plurality of zones and a sector number for one round on a track is different for each of the zones.

2. Description of Related Art

Conventionally, various kinds or types of recording/reproducing apparatuses for optical information recording medium are already known and are in practical use, which read out the recorded information optically for reproduction thereof, from an optical information recording medium on which the information is recorded by forming pits with use of so-called a phase-change or the like on a disc-like optical recording medium. In particular, recent years, an optical recording medium, being able to record a large amount of information with high density in the recorded information, was proposed and is now attracting attentions, for example that called by a "DVD" (digital versatile disc), and also a reproducing apparatus for reading out the information therefrom, but only a part of products thereof, is already available on a market.

However, with such the high density recording medium including such as the DVD, etc., for the purpose of increasing the density in information recorded on the disc-like medium, a laser beam is applied to, being shorter in the wavelength than that used in previous, and further for the purpose of increasing the density in track pitch, a concave portion and a convex portion, being called "a groove area" and "a land area" respectively, are formed on the recording surface of the medium, so as to record the information in those areas. More, the land area or the groove area appears alternatively for each round, following a tacking operation by an optical pickup as an optically reproducing means. Also, as such the high density recording mediums, there are proposed various kinds of recording mediums, such as a recording medium which enables only reproduction of the information recorded, a recording medium which enables recording of only one-time, and further a recording medium which enables a plurality of times of recordings, etc. However, among those kinds of the recording mediums, characteristics or properties are different to one another, in particular in reflectivity or reflection factor thereof.

On a while, in a recording/reproducing apparatus of optical recording medium for reproducing the recorded information from such the high density recording medium, in which such the concave and the convex portions, called as the land area and the groove area, are formed, conventionally, a control is applied for controlling a focus position of the optical reproducing means thereof, in which the focus position for the land area and the focus position for the groove area are exchanged alternatively, for each round, in synchronism with an address signal recorded in advance, in an area defined between the land area and the groove area, namely called by a pit address.

Also, from conventionally, a high reliability of the information is achieved by conducting a so-called verify control, i.e., it is verified or confirmed whether the recorded data can be reproduced correctly or not when recording information onto the optical recording medium.

However, for reproducing the information recorded with high density, it is necessary to control an optical pickup as the optical reproducing means, in particular the focus position of the focus lens, with higher accuracy. Ordinarily, with the recording/reproducing apparatus for optical information medium, the focus position is adjusted so as to be controlled at an appropriate position obtained in advance when being shipped, however, it is important to control the focus position at an appropriate position in conformity with, for example, the kind and/or condition of the recording medium, and further an environment of use of the apparatus, including the temperature and so on. For that purpose, modifying the focus position to an ideal position is conducted on a basis of the recorded data which is reproduced actually with the apparatus by applying a control, such as a learning control, etc.

However, as mentioned in the above, when controlling the optical pickup to the ideal or optimal position by paying attention only to the focus position for reproducing the information by means of the focus position control such as the learning control, etc., there should occur a problem in the reproduction of the address information recorded in the pit address area defined between the above-mentioned land area and groove area.

Namely, as is mentioned previously, the focus position of the optical pickup is controlled by exchanging between the focus position for the land area and the focus position for the groove area alternatively in synchronism with the address signal in the above pit address area. However, when the focus position of the above optical pickup is controlled to the position being optimal only for reproducing the recorded information in the land area or the groove area, it happens a case the address information in this pit address area cannot be read out correctly.

However, in the case where the address information in this pit address area cannot be read out correctly in this manner, since various operations, including the reproduction or the recording of the information, are performed on the basis of the address information in this pit address area with such the apparatus, it is impossible to ensure total operations of the recording/reproducing apparatus including a tracking control of the above optical pickup, and then the apparatus cannot accomplish the role as the recording/reproducing apparatus.

Further, the idea of the verify control itself was already known from conventionally, however, no teaching was given about the verify control on the optical information recording medium, in which the recording area is formed with a plurality of zones and the sector number is different for each of the zones.

SUMMARY OF THE INVENTION

Then, an object according to the present invention is, by taking the above-mentioned prior arts into consideration and also on a basis of acknowledges of the inventors of the present invention mentioned above, to provide a recording/reproducing apparatus for the optical information recording medium and a focus controlling method thereof, wherein the recorded information is read out to be reproduced or is recorded, in particular with the optical information recording medium in which is recorded information with high density by forming the land area and the groove area, and even in that instance, focus position of the optical head as the optical reproducing means can be controlled optimally, as well as address information can be obtained in the pit address area between the above the land area and the groove area always, thereby obtaining a good reproduction or recording operation under various conditions.

Further, an another object, according to the present invention, is to provide an information recording/reproducing apparatus for performing the verify control being suitable to the optical information recording medium, in which the recording area is formed with a plurality of zones and the sector number is different for each of the zones.

For dissolving the various problems mentioned above, according to the present invention, there is provided an information recording/reproducing apparatus for recording information by making the information of a plurality of sectors as one recording unit into an optical information recording medium, recording area of which is constructed with a plurality of zones, each being different in a sector number per one round of track, wherein a number of the recording units for conducting a verify control for each of the zones is changed on basis of a number of sectors per one round of track and a number of sectors for turning back by the one round of track.

BRIEF DESCRIPTION OF DRAWINGS

FIG. 6 is a block diagram of showing the entire construction of the recording/reproducing apparatus for optical information recording medium according to the above present invention;

FIG. 7 shows wave-forms of signals at various portions in the recording/reproducing apparatus for optical information recording media according to the above present invention;

FIG. 10 is a flow chart of showing a learning control for the focus control method, in the recording/reproducing apparatus for optical information recording media according to the above present invention;

FIG. 16 shows a table for exchanging from Write to Verify in the recording/reproducing apparatus for optical information recording media according to the above present invention.

DESCRIPTION OF THE PREFERRED EMBODIMENTS

Hereinafter, detailed explanation of the embodiments according to the present invention will be given by referring to attached drawings.

Figure 2:
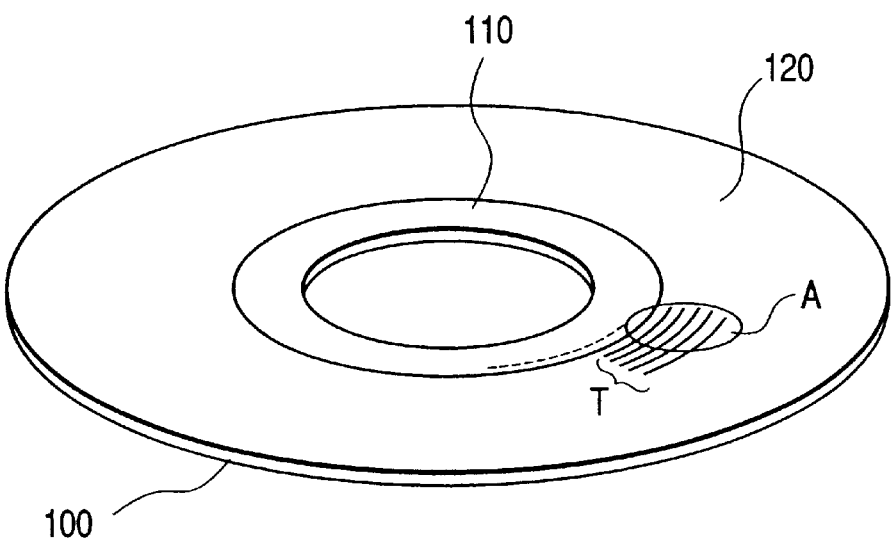
FIG. 2 is a perspective view of showing an outlook of a high density recording medium, such as a DVD, from and in which the information is reproduced/recorded with the above recording/reproducing apparatus for optical information recording medium according to the present invention.

First, in FIG. 2 attached, a high density recording medium, i.e., an optical information recording medium 100, such as the DVD-RAM, is shown, from which recorded information can be reproduced by a recording/reproducing apparatus of an optical information recording medium according to an embodiment of the present invention. Among such the optical information recording media, in particular in the medium being recordable one, such as called the DVD-RAM, wherein, the information can be written by forming so-called pits in the recording layer within a transparent substrate, for example, with utilizing the phase change due to irradiation of the laser beam, and thereafter the recorded information can be reproduced by this pits which are written into. Or, with the optical information recording medium for read-only, such as so-called the DVD-ROM, the laser beam is irradiated upon the recording surface on which the information was already written, so as to reproduced the recorded information in accordance with the reflection light thereof.

Here, as the optical information recording medium 100 shown in FIG. 2 is, for example, the above recordable medium called by the DVD-RAM, and is divided into a ROM portion 110, in the central portion of which are recorded predetermined information, etc., and a RAM portion 120 in the periphery thereof, as shown in the figure. And with such the high density recording medium mentioned above, in particular, in the RAM portion thereof, there is formed a track T in a spiral shape for recording the information with continuity on the disc, and this track is formed by separating into concave and convex areas, so-called by a land area and a groove area, for keeping high recording density.

Figure 3:
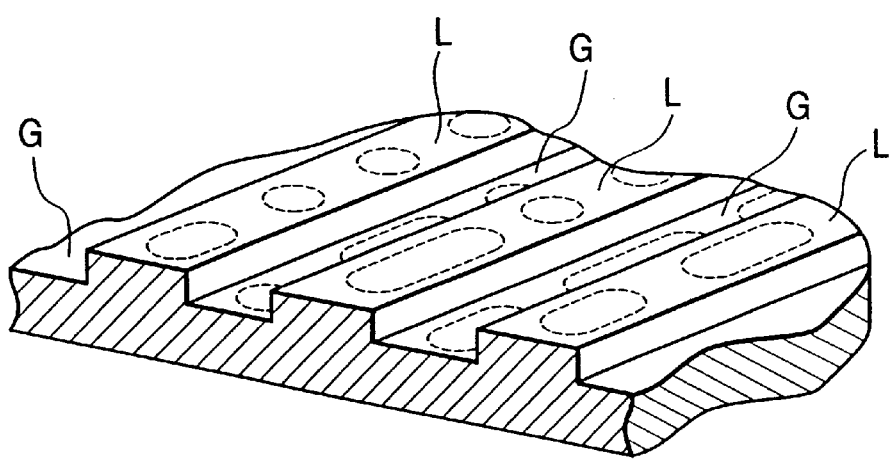
FIG. 3 is a cross-section view of showing a land area and a groove area of an information recording portion of the DVD shown in FIG. 2.

In FIG. 3, there is shown a cross-section of the land area and the groove area in the such information recording portion. In this figure, the land area is indicated by a mark L, while the groove area by G, and those land area L and groove area G are formed in the radial direction of the disc-like recording medium 100 one by one, alternatively. Also, in those land area L and groove area G are formed the so-called pits to record the information, as indicated by broken lines in the figure.

Figure 4:
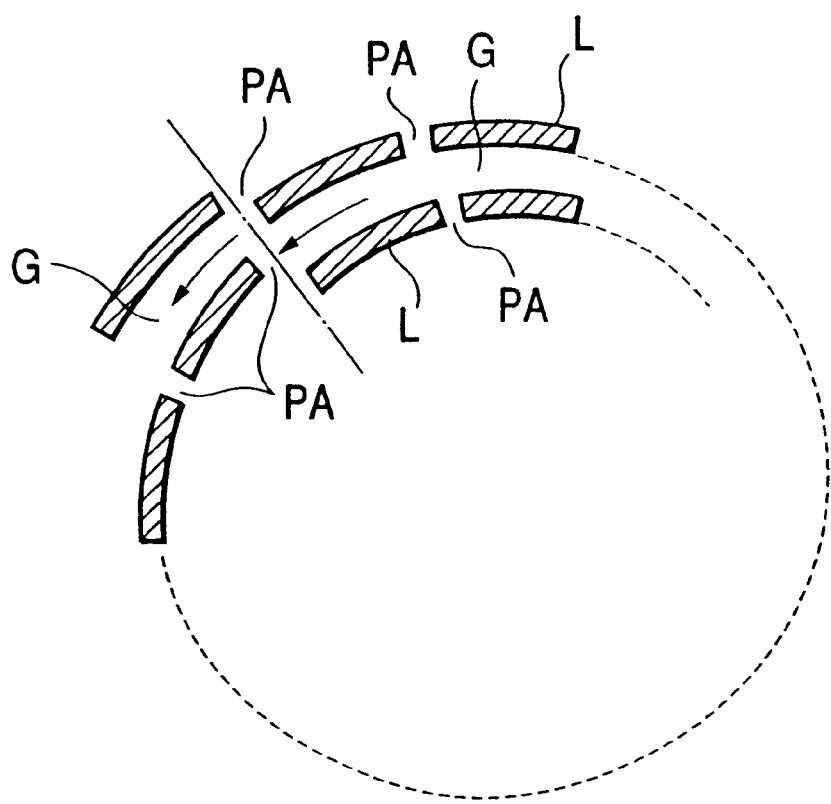
FIG. 4 is an explanatory view of showing a format of forming the land and groove areas of the high density information recording medium, such as the DVD.

Further in FIG. 4, there is shown a forming format of the above land area L and groove area G in such the high density recording medium, and in the figure, the land areas L are indicated by slant line portions, while the groove areas G are formed between those slant line portions. And, those land area L and groove area G are formed so as to exchange between the land area and the groove area alternatively by an unit of one round of the disc-like recording medium 100. However, in this figure, the land area L and the groove area G are exchanged on boarder of a portion of one-dotted chain line. Also, those land area L and groove area G are formed by units from 17 to 40 in the number thereof respectively, called as sectors, by the unit of one round of the track T on the disc. Between each sectors are divided by an area called by a pit address area PA. However, the RAM portion 120 within the disc is divided by zones in a direction from an inner periphery to an outer periphery. Within the each zone, the same number of the sectors are constructed, therefore the more in the sector number per one round of the track, the outer the zone.

Figure 5A:
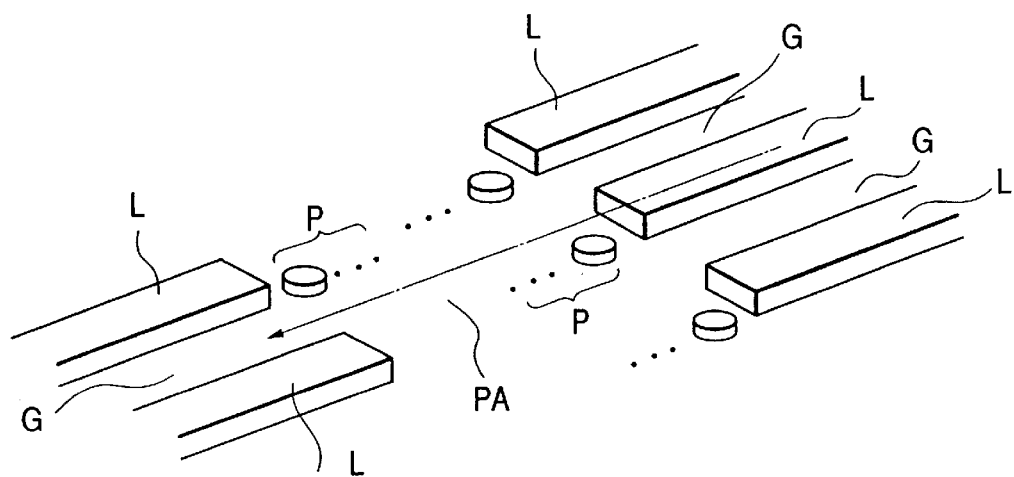
FIG. 5 is an enlarged perspective view of showing a pit address area formed between the land area and the groove area in the above DVD.

In FIG. 5, there are shown the pit address areas formed between those land area L and groove area G. First, FIG. 5(A) shows a portion in which the track shifts from the land area L to the groove area G (the pit address area of the portion of one-dotted chain line in FIG. 4), and the laser beam for detecting the recorded signal shifts, for example, from the land area L through this pit address area PA to the groove area G, as shown by an arrow of one-dotted chain line in the figure.

Figure 5B:
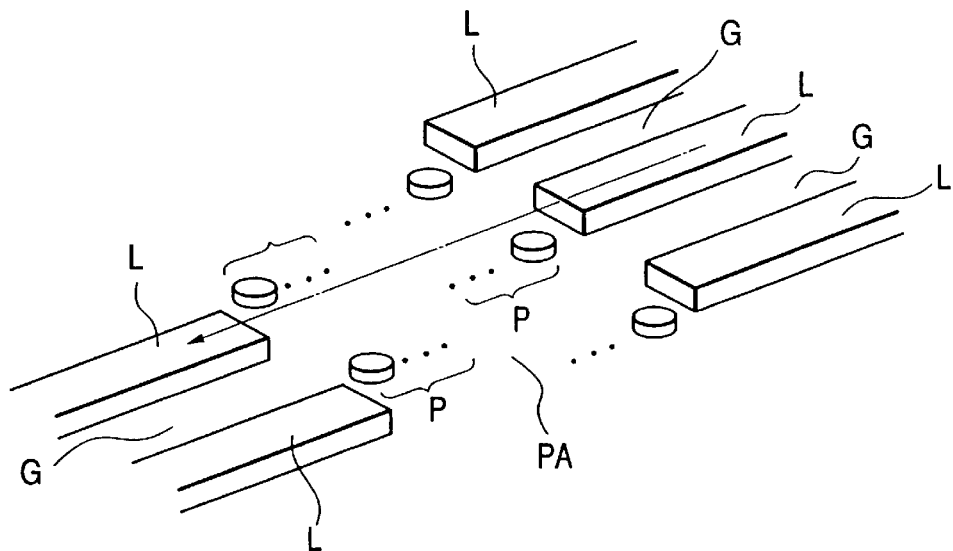

On a while, FIG. 5(B) shows a portion in which the track shifts from the land area L to the land area L, and here also, the laser beam for detecting the recorded signal shifts, for example, from the land area L through this pit address area PA to the land area L, as shown by an arrow of one-dotted chain line in the figure. Further, when shifting from the groove area G to the next groove area G, it is needless to say but the laser beam also passes through the pit address area PA, in the same manner as in the above.

In this manner, in the recording medium 100 recording the information with high density, the information is recorded in the land area L and the groove area G alternatively, which are different from each other in the height thereof, therefore, for reproducing the recorded information from such the recording medium with certainty, it is necessary to control the optical pickup optimally, i.e., the optical reproducing means for reproducing the recorded information by use of the reflection light of the laser beam, in particular the focus position of the optical lens (i.e., the focus lens) for irradiating the laser beam for reproduction focused on the recording medium surface, with respect to the respective land area L and groove area G being different in the height.

Also, at the same time, in the pit address area PA mentioned above, as is apparent from the figure, address numbers on the above recording medium 100 are recorded on both sides thereof, by a plurality of pit train P, P . . . . Therefore, for reproducing the information recorded from such the recording medium 100, it is necessary to detect those plurality of pits, P, P . . . in the pit address area PA correctly or accurately.

Then, according to the present invention, in order to control the focus position of the optical lens in the above optical reproducing means optimally, in the reproduction of the recorded information from such the high density recording medium 100, there is provided the recording/reproducing apparatus of an optical information recording medium, with which the control of the optimal position by applying the learning control is performed, as well as the pits P, P . . . for recording the address number in the above pit address area PA can be detected with certainty.

First, the total construction of the recording/reproducing apparatus of the optical information recording medium according to a first embodiment of the present invention is shown in FIG. 6. In this figure, a reference numeral 100 indicates, in the same manner as in the above, the high density recording medium, and a reference numeral 200 indicates the optical pickup as the optical reproducing means, which comprises a semiconductor laser 210 of the light emitting element for emitting the laser light beam of a desired wave-length, a condenser optical lens 220 for making the laser beam a parallel light, a half mirror 230 for permeating a part of an incident light as well as for reflecting the other portion thereof, a mirror for changing a direction of the light, a focus lens 250 for converging the laser light beam into a predetermined beam diameter on the recording surface of the above high density information recording medium 100, and a light receiving element 260 for detecting the reflection light from the above half mirror 230.

Also, in the above-mentioned FIG. 6, a reference numeral 300 indicates a signal processing portion for performing a predetermined processes by converting the reflection light detected by the light receiving element 260 in the above optical reproducing means into an electrical signal, and this signal processing portion 300 is connected to a micro-computer 400 provided for controlling the optical information recording/reproducing apparatus as a whole, thereby conducting various controls, including the focus control which will be mentioned in details later. Namely, this micro-computer 400 is further connected to a laser driver circuit 500, a shift control circuit 600, a spindle control circuit 700, and a two-dimension actuator controller circuit 800.

Namely, with such the construction mentioned above, the micro-computer 400 controls the intensity of the emission light by controlling current supplied to the semiconductor laser 210, i.e., the light emitting element of the optical pickup of the optical reproducing means mentioned above, and also control the position of the above optical pickup 200 in the radial direction of the optical disc 100 by controlling the rotation of a motor 650 for shift control. A reference numeral 660 indicates a gear for shifting the optical pickup 200 in the radial direction by rotating the motor 650 for shift control mentioned above.

Also, the micro-computer 400 realizes a control of a linear velocity constant which is widely adopted in such the high density information recording medium, such as a CLV (constant linear velocity) or a ZCLV (zoned constant linear velocity), etc., by controlling the rotation of a motor 750 which rotationally drives the spindle. In particular, in the ZCLV of the latter, a revolution number (or angular velocity) is controlled to be constant in each zone, and the revolution number is changed for every zone. Further, this micro-computer 400 realizes the focus position control of the focus lens 250 in the above optical pickup 200, with electromagnetic function by use of an electro-magnetic coil 850 or the like, as an actuating means for example, through the two-dimension actuator control circuit 800. However, the two-dimension position control of the focus realized with this two-dimension actuator control circuit 800 includes, in addition to the position control of the focus lens 250 in a direction perpendicular to the recording surface of the above optical disc 100, further the tracking position control for tracing on the track with minute position adjustment in the radial direction perpendicular thereto.

Figure 1:
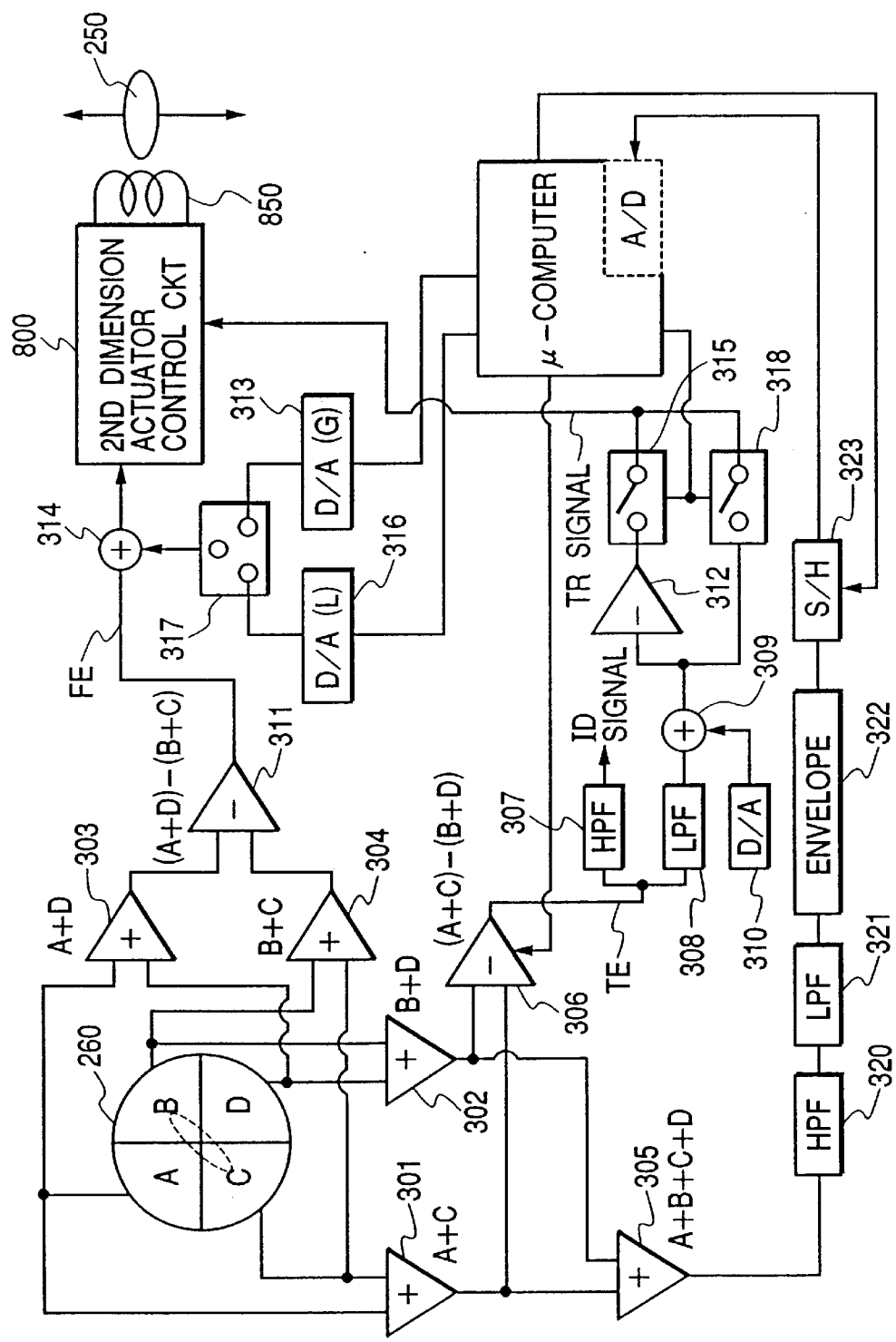
FIG. 1 is a detailed diagram of the circuit structure centering around a signal processing portion for processing a detected signal from a light receiving element of a recording/reproducing apparatus for optical information recording medium in accordance with the present invention.

Next, in the attached FIG. 1, there are shown the detailed construction of those including the light receiving element 260, the signal processing portion 300 for processing the detected signal as well as the periphery portions thereof, in particular in the optical pickup 200 as the optical reproducing means in the recording/reproducing apparatus of the optical information recording medium according to the one embodiment of the present invention.

As is apparent from the figure, the light receiving element is divided into four detector portions A, B, C and D, and the reflection light incident upon this light receiving element 260 reflected upon the recording surface of the above high density recording medium 100 are converted into electric signals to be outputted through the detector portions divided, respectively. Here, the outputs from the respective detector portions A, B, C and D divided are inputted into adder circuits 301 through 304, thereby being added by (A+C), (B+D), (A+D) and (B+C), respectively. Further, the outputs from the above adder circuits 301 and 302 are inputted to an adder circuit 305, thereby being outputted a sum signal (A+B+C+D) by adding all of the outputs from the above detector portions A, B, C and D.

Further, at the same time, the outputs from the above adder circuits 301 and 302 are inputted into a subtraction circuit 306, thereby being outputted a tracking error signal TE at the output thereof, i.e., the signal for the tracking as is expressed by ((A+C)−(B+D)). From this tracking error signal TE is obtained an ID signal by passing it through a high pass filter (HPF) for high frequency, thereafter. Namely, this ID signal can be obtained by reading the address number pits P, P . . . shown in the above FIG. 6, as the signal wave-form as shown in FIG. 7(A), for example. Further, this ID signal read out is inputted into the above micro-computer 400, and is acknowledged as the address number for each of the sectors on the track of the recording surface of the above high density recording medium 100.

On a while, at the same time, after passing through a low pass filter (LPF) 308 for low frequency, this tracking error signal TE is added with an off-set value from a D/A converter 310 by an adder circuit 309. For tracking control in the groove area, first, the tracking error signal TE is reversed in the polarity thereof through a reverse circuit 312, and further is outputted to the above two-dimension actuator control circuit 800 through a switch element 315. On the other hand, for the tracking control in the land area, it is outputted to the above two-dimension actuator control circuit 800 through a switching element 318 thereafter. However, to one of the switching elements, i.e., the switching element 318 for passing the tracking control signal for the land (L) area, the above UG exchange signal is inputted though a reverse circuit 319. Namely, on the basis of the tracking error signal TE, the tracking control signal for the land (L) area and the tracking control signal for the groove (G) area are alternatively outputted to the above two-dimension actuator control circuit 800. This output comes to be a TR signal for controlling the tracking, thereby controlling the position of the optical reproducing means 200 in the radial direction through the shift controller circuit 600 in the above FIG. 6. Further, to the D/A converter 310 is given the off-set value from the above micro-computer through the A/D converter portion thereof. However, an explanation of this will be omitted, since it has a little relationship with the present invention.

On a while, the signals (A+D) and (B+C) outputted from the above adder circuits 303 and 304 are inputted to the subtraction circuit 311, thereby being obtained the focus error signal FE which can be expressed by ((A+D)−(B+C)). This focus error signal FE is divided into a focus control signal for the above land area and a focus control signal for the groove area to be processed, and thereafter controls the focus position (in a direction perpendicular to the recording surface of the high density recording medium 100) of the focus lens 250 of the above optical reproducing means 200 through the two-dimension actuator control circuit 800.

Namely, the focus error signal FE, as the output from this subtraction circuit 311 ((A+D)−(B+C)), is applied with the focus off-set through the adder circuit 314, and is outputted to the two-dimension actuator control circuit 800. The settings of the off-sets for those groove and land in the D/A 313 and D/A 316 are applied to the adder 314 through an analogue switch SW 317.

Here, in those D/A converters 313 and 316 are given the off-set values for the focus control on the above groove area and land area from the micro-computer 400, respectively. Also, into the control input of the above switching element 317 is inputted an exchange control signal which is also outputted from the micro-computer 400, i.e., the exchange signal between the land (L) area and the groove (G) area.

Further, the off-set values added to the focus error signal FE through the above D/A converters 313 and 316, in the present invention, are variables which must be learned in the learning control adopted for controlling the focus position of the optical lens at the optimal position. However, when this recording/reproducing apparatus of the optical information recording medium is shipped out as products, these are preset at predetermined initial values in advance to be shipped. The preset predetermined initial values are memorized in an EPROM as being a memory means of the above micro-computer 400.

Further, the sum signal (A+B+C+D) from the above adder circuit 305 is, thereafter, passes through the high frequency pass filter (HPF) 320, the low frequency pass filter (LPF) 321, and further an envelope detector circuit 322, and is taken into the above micro-computer 400 by a sample hold (S/H) circuit 323 and the A/D converter portion thereof. The timing taken by the sample hold (S/H) circuit 323, also will be explained later, depends on a sample hold (S/H) timing signal outputted from the micro-computer 400.

Next, a focus controlling method in the recording/reproducing apparatus of the optical information recording medium, according to the present invention, being mentioned in the details of the construction thereof above, will be explained by referring to flow charts shown in FIGS. 8 and 10.

Figure 8:
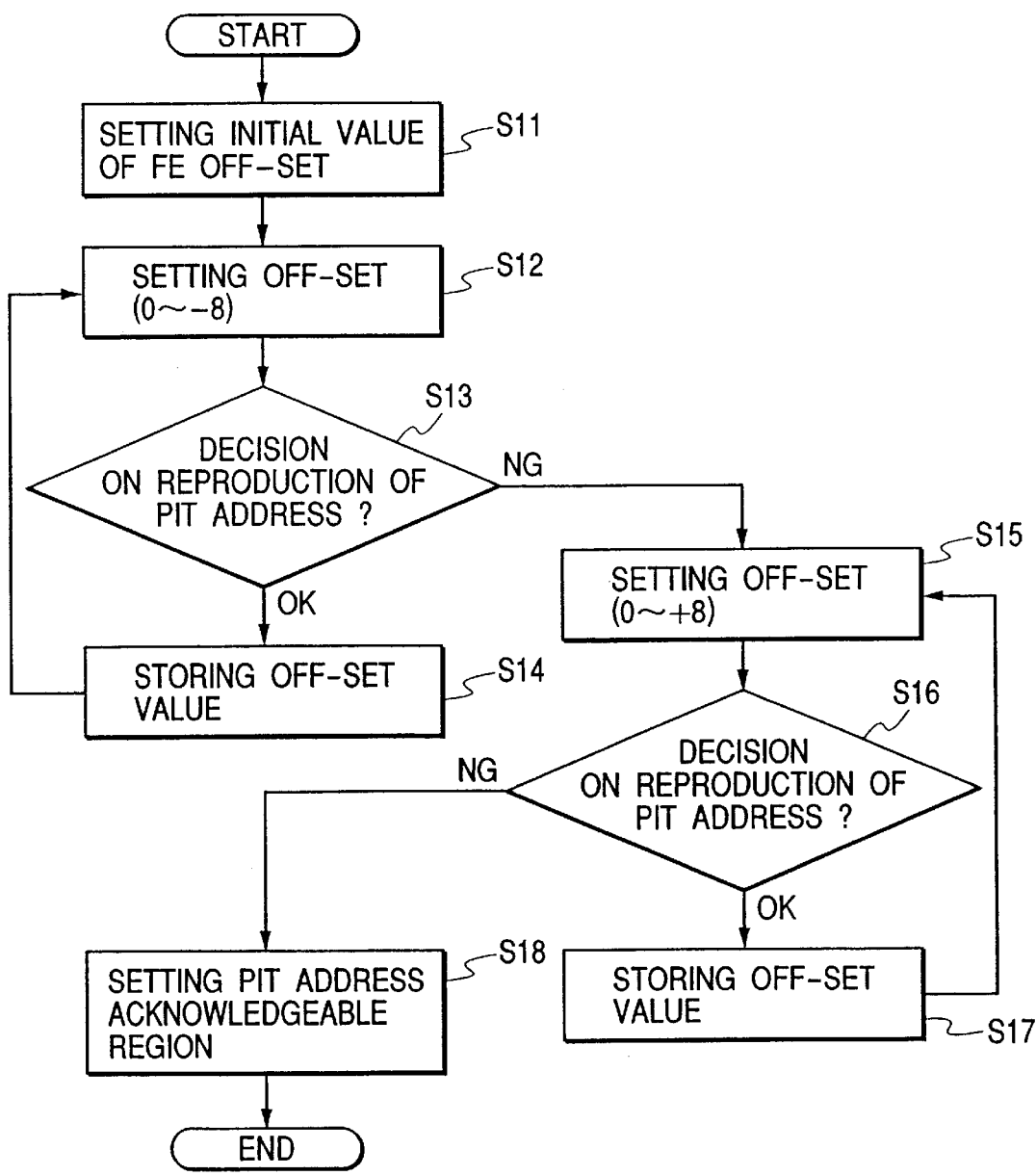
FIG. 8 is a flow chart of showing a focus control method in the recording/reproducing apparatus for optical information recording medium according to the above present invention.

First, the flow chart shown in FIG. 8 is conducted before performing the learning control which will be shown in FIG. 10 below, thereby setting up a variable region of the focus potion in the learning control in advance. This flow is initiated at the same time when the reproducing apparatus is turned ON, for example, and is executed on the basis of the various output signals shown in the above FIG. 1, as well as of the above land and groove areas, respectively.

Figure 9A:
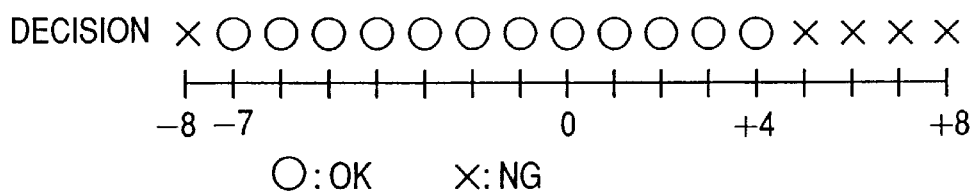
FIG. 9 is an explanatory view of showing the details of pit addresses acknowledgeable regions which are set up with the areas of the focus control method shown in the above FIG. 8.
Figure 9B:
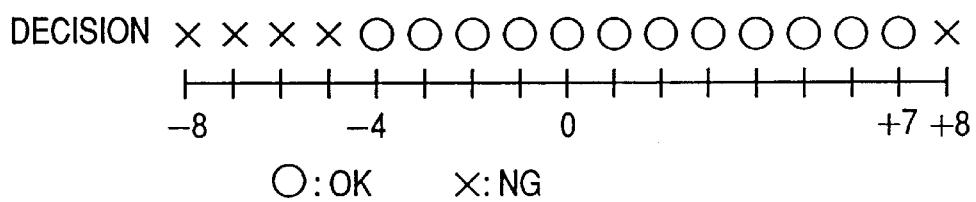

In this flow, first, the off-set value of the focus error (FE) is set up at the initial setting value (in step S11). Namely, the above micro-computer 400 sets the initial setting value at the D/A converter 313 and 316, which are memorized in the EPROM or the like when being shipped out. After that, the micro-computer 400 sets up a plurality of steps (for example, 16 steps from +8 step to −8 step) around the initial setting value (0) for control, as shown in attached FIG. 9, and changes the focus position by setting the respective step values as the off-set value for the above focus error (FE). And, then a decision is made on reproduction of the pit(s) in the pit address area at the plural focus positions. In this instance, as an condition for the decision on reproduction of the pit(s), by using the ID signals shown in the above FIG. 7(A), it is decided whether the ID signals can be acknowledged in continuous or not in the region of one round of track. Or alternatively, also the sector number detectable within one track can be a condition for such the decision.

Namely, in the above FIG. 8, first, as the off-set value is set the value from 0 down to −8 step one by one (in step S12), then it is decided whether the address can be reproduced or not by trying to acknowledge the pits P, P . . . in the above bit address area PA at each of those focus positions (in step S13). As the result, if the pit address can be reproduced (i.e., OK in the figure), the off-set value is stored (in step S14), this process is repeated until when the reproduction of the pit address comes to be impossible (i.e., NG). Thereafter, in the same manner as mentioned in the above, setting the value from 0 up to +8 step as the off-set value one by one (in step S15), making the decision in reproduction (in step S16), storing the off-set value being reproducible (in step S17), repeating this until when the reproduction comes to be impossible (i.e., NG), and finally, the off-set values within a region being variable with the learning, i.e., the off-set values with which the pit address can be recognized or acknowledged is determined by the step range (in step S18) to be completed in the process.

As a result of this, the range in which the pits P, P . . . in the pit address area PA can be recognized with certainty can be set up in the steps from −8 up to +8 around the initial off-set value (0) in the focus position control. In more details, in the above FIG. 9(A) for example, since "NG" is at the steps −8 and +5 for the focus control in the land area, it is apparent that the pits P, P . . . in the pit address area PA can be acknowledged with certainty in the region between them, at the steps from −7 up to +4. From this, for the focus control in the land area, it is possible to control the focus position at the optimal position with keeping the reproduction of the pit address, by conducting the learning control within the range of the steps from −7 up to +4. Further, it is also same to the above for the focus control in the groove, and in an example shown in the above FIG. 9(B), it is apparent that the learning control can be conducted within the range of the steps from −4 up to +7 later.

Following to the above, an explanation will be given on the learning control for controlling the optimal focus position in the above land and groove areas in which the information is recorded respectively, by referring to FIGS. 10 to 12. However, when a non-recorded disc is inserted, recording is conducted by driving the laser driver circuit 500 in test zones assigned at the most-inner periphery and the most-outer periphery of the disc. In the present learning control, since a relative change is used in amplitude of the reproduced signal of the recorded data, the setting of the recording pattern may be enough for the initial values which are set up in advance.

First, FIG. 10 shows a process flow of the learning control for the optimal focus position control, briefly. First, the reproduction of the data is conducted (in step S21). However, in this instance, as shown in the above FIG. 7(A), at a top portion of each of the sectors is positioned a VFO portion in which a predetermined pattern (number) of the pits having a predetermined width, being called "4T", for example, and after that follows a data (DATA) portion in which the reproducible recorded information is recorded. And, here, the controlling of the optimal focus position is achieved by utilizing the intensity of the reflection light in this VFO portion. Namely, in this VFO portion, the waveform of the reproduced signal is as shown in FIG. 7(C), however, from the above envelope detection circuit 322 (see FIG. 1) for outputting an envelope wave-form is outputted an output as shown in FIG. 7(D), i.e., a signal being always constant in the height (voltage) if the reflection factor is constant on the recording surface of the above recording medium 100. Mentioning of the reasons of adopting the 4T pattern, it is stable with respect to fluctuation of the recording pattern in the medium of type of phase change, and it was ascertained by experiments that by the greatest amplitude of this 4T pattern can be obtained the focus position at the optimal condition for recording and reproducing with the land-groove method.

Then, as is apparent in the above FIG. 1, the micro-computer 400 outputs the sample hold (S/H) signal during the period of this VFO portion, and takes in the height of the above envelope wave-from (see FIG. 7(D)) from the sample hold (S/H) circuit 323 as the value of amplitude of the reproduced signal detected. The sample hold (S/H) signal in this time and the height of the envelope wave-form to be taken in therewith, i.e., the amplitude of the reproduced signal detected (amplitude of the reproduced signal detected) are shown in the above FIGS. 7(E) and (F).

Again returning to FIG. 10, in the learning control for the optimal focus position control, next, the off-set of the focus error signal (FE) is set up (in step S22). Namely, here is set up the extent or limit with the acknowledgeable region of the pit address which is obtained in the step S18 in the above FIG. 8. In more details, for example, as shown in the above FIG. 9(B), the region being able to be set up for the groove (G) area is from −4 to +7, and this step value is set.

Thereafter, as is explained in the above, on the basis of the amplitude of the reproduced signals detected which are taken into from a plurality of the sectors, the off-set value (the step values) of the focus error (FE) is obtained at which the signal amplitude in each sector becomes maximum (step S23). And, by averaging those off-set values in the focus error (FE) obtained for each sector, there are obtained optimal off-set values $FE_{off(L)}$ and $FE_{off(G)}$ of the focus error (FE) for the land (L) area and the groove (G) area in the recording medium 100.

Figure 11:
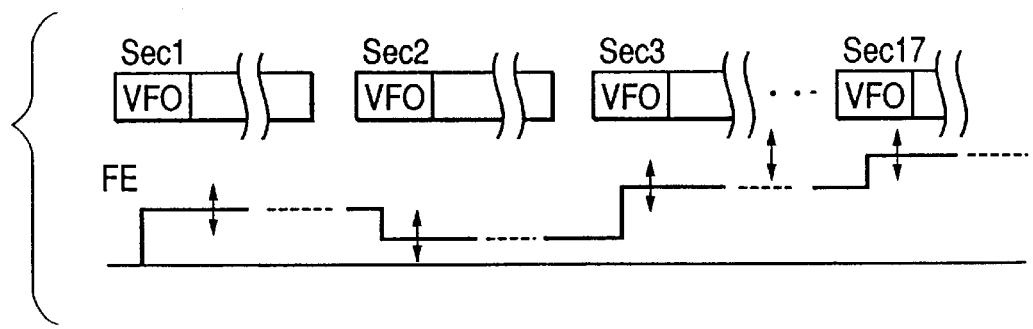
FIG. 11 is an explanatory view of explaining an optimal FE off-set value for each sector which is set up by the learning control in the above FIG. 10.
Figure 12:
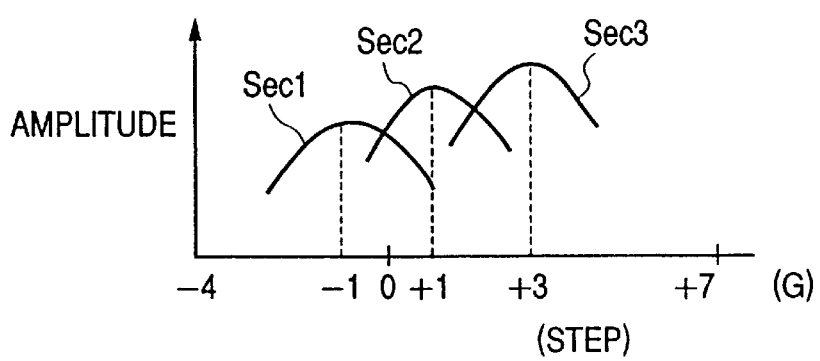
FIG. 12 is an explanatory view of explaining about the FE off-set value which is set up by averaging, in the earning control shown in the above FIG. 10, with simplification thereof.

However, in the above, for dissolving non-uniformity (i.e., variety) in the reflectivity by an unit of the sector in a circumference direction of the disc, i.e., the recording medium, namely as shown in FIG. 11, for example, and when the reproduced signals detected are different in amplitude thereof one another (see FIG. 7(C)) in each sector (from Sec. 1 to Sec. 17), first, the optimal FE off-set values are obtained in each sector (in more details, by averaging the FE off-set values of a sector bridging over a plurality of circumferences being equal in the radial direction). Thereafter, by averaging the FE off-set signals of all sectors, there are obtained the optimal FE off-set values $FE_{off(L)}$ and $FE_{off(G)}$. Explaining this by simplifying in the attached FIG. 12, for example, in a case where there are obtained the off-set values, −1, +1 and +3, respectively for the three sectors, Sec. 1 to Sec. 3, at which the reproduced signals detected becomes maximal, the optimal FE off-set value is +1 (by unit of step) by averaging them. As a method for obtaining the focus off-set value of this maximum value in amplitude, there are methods, including a finite difference method, calculation of maximal position by approximation with a curve of second degree, and a method of obtaining from a half of values at the off-set positions at right and left by decreasing by −1 dB in amplitude values from the amplitudes obtained to be almost maximal, etc.

In this instance, as is apparent from the above explanation, in a case where the optimal FE off-set value obtained by the above control exceeds the extent or limit in step (from −7 to +4) set in the above step S22, the value of which is the most approximate or nearest value among the set values, i.e., either −7 or +4 is set as the optimal FE off-set value. Namely from this, it is possible to control the focus position of the above optical pickup at the optimal position while always reading out the address signals in the pit address area with accuracy, without the damaging in operations of the reproducing apparatus as a whole due to omission of the address information, thereby enabling the superior focus control always.

However, in the explanation in the above, so-called the learning control is explained, as the one method for the optimal positioning control in the focus, however, the present invention should not be restricted to such the learning control only. Namely, it is apparent that the present invention can be also applied to even when adopting other control methods for performing the optimal positioning control of the focus, in the same manner as mentioned in the above.

Further, in the explanation of the above embodiment, the explanation was given only on the reproducing apparatus and the operations thereof, which reads out the information being recorded in the above optical information recording medium 100 in advance. However, the present invention should not be restricted to the reproducing apparatus for use only in reproducing (i.e., read-only), but further it can be applied to the recording/reproducing apparatus of the optical information recording medium having a function of writing information in addition thereto. And, when applying the present invention to the recording/reproducing apparatus for the optical information recording medium, it is possible to apply the present invention to the focus control not only when reproducing the information but also when recording the information, in the same manner as mentioned in the above. And also in such a case, since the address information on the recording surface of the optical information recording medium can be obtained with certainty when recording, it would be apparent from the above explanation to obtain the more optimal recording operation of information.

Next, an explanation will be given on a recording process of information with use of the learning control for the optimal positioning control of the focus mentioned previously.

Figure 13:
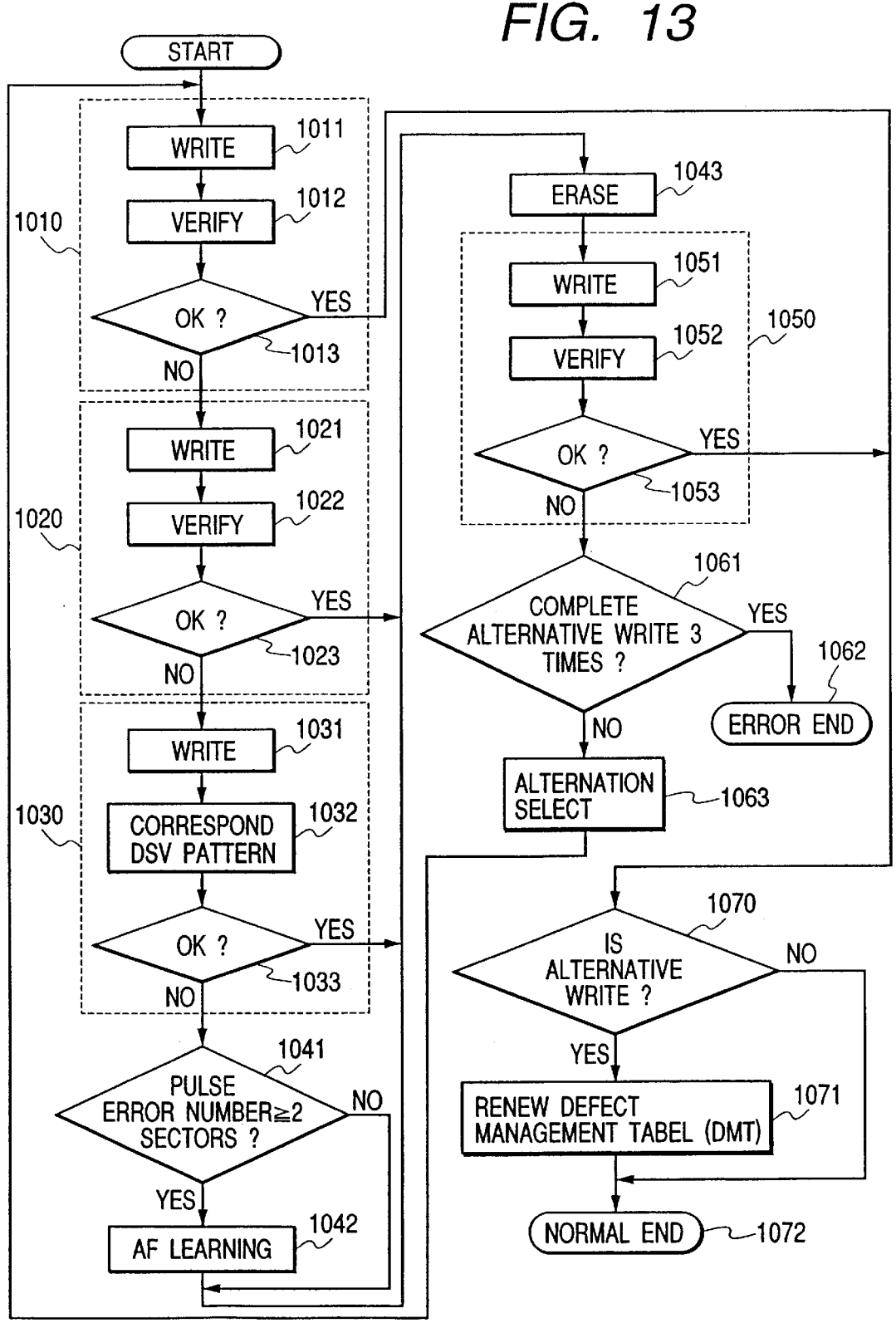
FIG. 13 is a flow chart of showing an operation for writing into the optical information recording medium, i.e., the high density recording medium, such as a DVD-RAM.

FIG. 13 shows a flow chart of showing the operations for writing information into the optical information recording medium, in particular, into the high density recording medium, such as the DVD-RAM.

In FIG. 13, with the present embodiment, in a case where the information is not written correctly by trying an initial WRITE/VERIFY (in step 1010), then a first retry (in step 1020), further a second re-try (in step 1030), and furthermore a third retry (in step 1050) will be made.

In more detail, in the initial WRITE/VERIFY (in step 1010), in particular in a step 1011, first the light such as of a laser is irradiated upon the high density recording medium, for example the DVD-RAM, etc., so as to execute the writing (Write) of the information. Next, in a step 1012, after executing the writing, the information is taken out so as to verify (Verify) whether it can be reproduced as a signal or not. If it is written correctly, then the process proceeds into a step 1070 to be completed.

In a case where the information is not written correctly, it proceeds to a step 1021, then the writing of the information is executed again. After completing the writing, it proceeds to a step 1022, so as to verify or ascertain whether the information is written correctly or not, and if it is written correctly, it proceeds to a step 1023 to be completed or ended.

In a case where the information is not written correctly even if re-writing it again, it proceeds to a step 1031 so as to execute the writing of the information once again.

With the writing of the signal in the step 1021 mentioned above, since there is a possibility that it is not written correctly due to adhesion of finger prints or the like on the high density recording medium, such as the DVD-RAM, then the information is simply re-written once again without any change in the setting values for verifying, so as to be verify it. However, when the writing of the signal executed in the step 1031 is not correct, there is a possibility that the recording pattern of the information which is written can be read out with a specific reproducing parameter(s) only, then verification is made on the writing condition of the signal by changing the parameter(s) in the signal reproduction system (in step 1032). If it is verified that the signal is written correctly with this step 1032, the process proceeds into a step 1070 to be completed, however, if the signal cannot be reproduced correctly even with the changing of the parameter(s) in the signal reproduction system, it proceeds to a step 1041 so as to count up a pulse error number of the written signals with a specific counter.

If the number of sectors, in which the pulse error number counted in the step 1041 exceeds a predetermined number, is less than 2, the process goes to a step 1043 to delete the signals written into the high density recording medium, such as the DVD-RAM, and thereafter it goes to a step 1051 to execute the writing of the signal into the high density recording medium, such as the DVD-RAM, once again.

If the number of sectors, in which the pulse error number counted exceeds a predetermined number, is equal of more than 2, it is decided that the signal cannot be reproduced due to running off of the focus, then the optimal control of the focus position (i.e., an AF control) is performed with the learning control mentioned above (in step 1042).

Here, the reason of selecting the counting of the pulse error number to be equal or more than 2 lies in that, since there is a possibility to detect information (such as pulse error, etc.) on the track being close to the track on which the writing process is conducted, due to the high density of the recording medium, correct error decision cannot be obtained if only one sector is counted.

After conducting the AF learning control mentioned above, the process proceeds to a step 1043 to delete the information written into the high density recording medium, such as the DVD-RAM, thereafter it proceeds to a step 1051 to execute the writing of the information onto the high density recording medium, such as the DVD-RAM, again.

After executing the writing, it is verified whether the information is written correctly or not, and if it is recorded correctly, it goes to a step 1070 to be completed.

If the information is not written correctly, since the cause of incorrect writing of the information cannot be considered to be in the side of the information recording/producing apparatus, but in defect(s) in the area itself of the optical information medium, into which the information is to be written, the process goes to a step 1061, then the writing of information is conducted into a preliminary recording area called as an alternative area in place of the portion where the writing of information cannot be done, in accordance with the steps from 1011 to 1053 mentioned above (i.e., alternative Write).

If the signal cannot be written into the high density recording medium, such as the DVD-RAM by executing the writing of signal with the alternative Write, the process is ended (in step 1062).

When recording into the high density recording medium, such as the DVD-RAM, the recording operation will be repeated by several times, in the same manner as explained in the above by referring to the flow chart. However, with conducting the AF learning control every time when the operation is repeated, the efficiency is deteriorated since it increases the time necessary for recording. Then, the AF learning control in the step 1042 may be prohibited from operating for a predetermined time after once the AF learning control is conducted. The value of the predetermined time can be set so that the environment in use would not change abruptly, and more preferably, in a range from 2 minutes to 5 minutes approximately. Further, it is also possible to provide a function of writing test for obtaining an optimal optical recording power for recording the information, by comparing an answer obtained with the AF learning control with the answer with the previous AF learning control, if the step value mentioned previously is sifted by at points or more.

Figure 14:
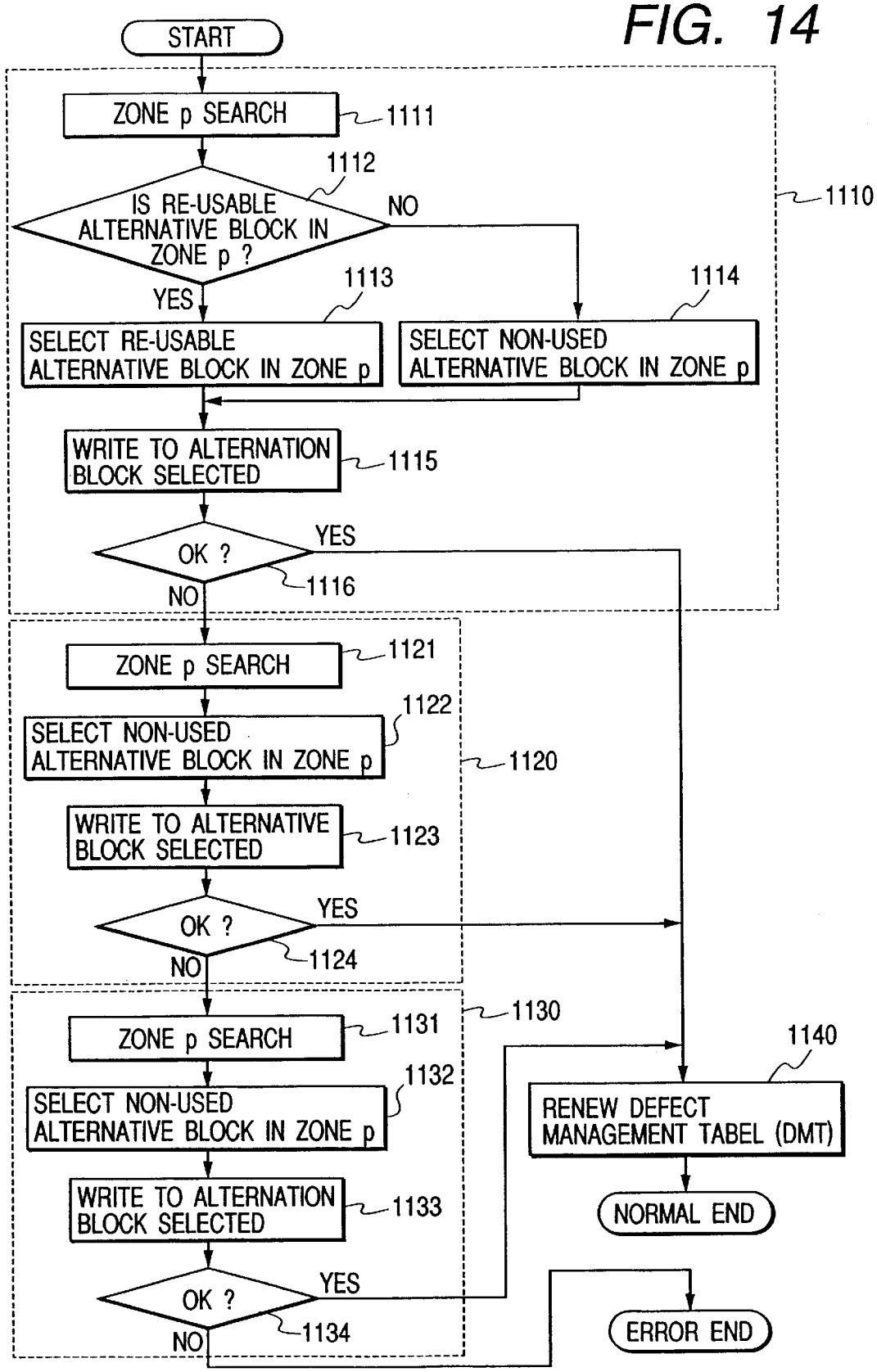
FIG. 14 is a flow chart of showing an operation of selecting an alternative block in the recording/reproducing apparatus for optical information recording media according to the above present invention.

Next, an explanation will be given on the operation of selecting the alternative block for executing the above alternative Write. FIG. 14 shows a flow chart for selecting the alternative block. First, in a step 1110, an alternative block is selected for conducting a first alternative Write. In the selecting of the alternative block, first a zone p (p is a zone No. of an origin of alternative) is searched (in step 1111), then a confirmation is made whether there is a re-usable alternative block(s) or not in the zone p (in step 1112). If there is the re-usable alternative block, the step goes to a step 1113 to select the above-mentioned alternative block(s), so as to perform the recording into the high density recording medium, such as the DVD-RAM, in accordance with the Write re-try flow mentioned previously. If the recording is performed correctly, the process goes to a step 1140 to be completed (i.e., a normal end).

If there is no re-usable alternative block(s), the step goes to a step 1114 to select an non-used alternative block(s) in the zone p, then performs the recording into the high density recording medium, such as the DVD-RAM (in step 1115), in accordance with the Write re-try flow mentioned previously. If the recording is performed correctly, the process goes to the step 1140 to be completed (i.e., the normal end).

When the recording into the high density recording medium, such as the DVD-RAM, cannot be obtained by the first alternative Write, the process goes to a step 1120 to conduct a second alternative Write. In this second alternative Write, there are performed a searching of the zone p (in step 1121) and then a selecting of the non-used alternative block(s) within the zone p (in step 1122), and then is performed the recording into the high density recording medium, such as the DVD-RAM (in step 1123), in accordance with the Write re-try flow mentioned previously. And, if the recording is performed correctly, the step goes to a step 1140 to be ended (i.e., the normal end).

If the recording into the high density recording medium, such as the DVD-RAM, cannot obtained with the second alternative Write, the step goes to a step 1130 to perform the third alternative Write. In this third alternative Write, there are performed a searching of the zone p (in step 1131) and then a selecting of the non-used alternative block(s) within the zone p (in step 1132), and then is performed the recording into the high density recording medium, such as the DVD-RAM (in step 1133), in accordance with the Write re-try flow mentioned previously. And, if the recording is performed correctly, the step goes to the step 1140 to be ended (i.e., the normal end).

In the case where the recording into the high density recording medium, such as the DVD-RAM, cannot be obtained even by conducting the alternative Write operation three by (3) times, it is decided that there is a defect(s) in the high density recording medium, such as the DVD-RAM, and the process is ended (i.e., an error ending).

Figure 15:
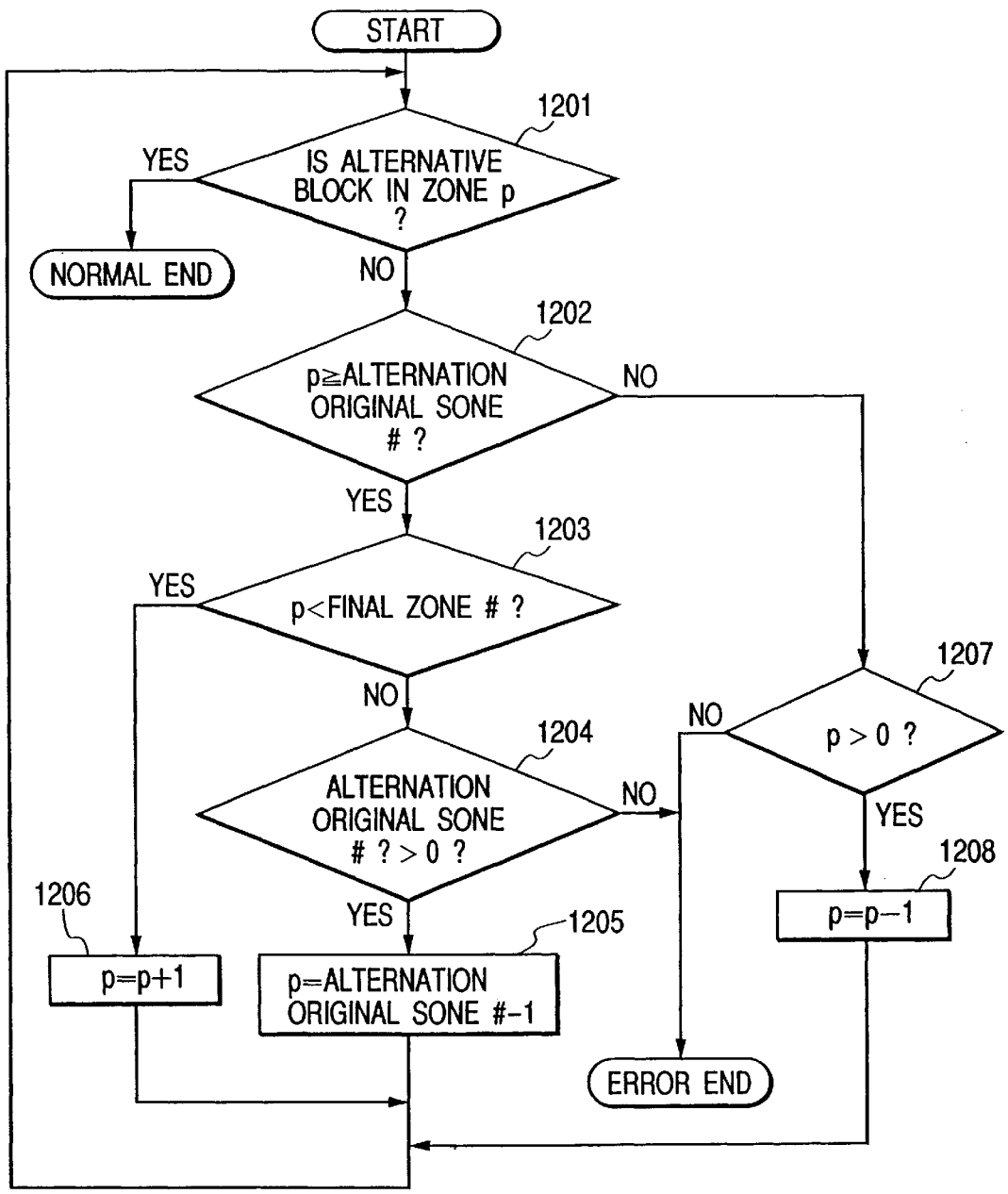
FIG. 15 is a flow chart of showing an operation of searching the alternative zone by the recording/reproducing apparatus for optical information recording media according to the above present invention.

Next, an explanation will be given on the operation of searching the alternative block. FIG. 15 shows a flow chart for searching the alternative block. In this FIG. 15, first, a confirmation is made whether there is the alternative block(s) or not in the zone p (in step 1201), and the process is ended normally if there is the alternative block. Then, going into the step 1113 in FIG. 14, the recording is performed into the high density recording medium, such as the DVD-RAM. If there is no alternative block in the zone p, the process goes to a step 1202 to ascertain if the p is equal or greater than the zone No. of the origin of alternation. If the p is not greater than the zone No. of the origin of alternation, the process goes to a step 1207 to ascertain whether the p is greater than 0. If the p is greater than 0, then the step turns back to the step 1201 by changing the value of p into p−1 so as to perform the search of the alternative block(s). If the p is less than 0, it comes to be an error, the process is ended (i.e., the error end).

If the p is equal or greater than the zone No. of the origin of alternation, then the process goes to a step 1203 to ascertain whether the p is equal or less than that of a final zone No. If it is smaller than that, by changing the value of p into p+1 (in step 1206), the process turns back to the step 1201, and then conducts the search of the alternative block(s) again. If the p is greater than the final zone No., the process goes to a step 1204 and ascertains if the zone No. of the origin of alternation is greater than 0 or not. If it is greater than 0, the step turns back to the step 1201 by changing the value of p into "zone No. of origin of alternation −1" (in step 1205), so as to perform the search of the alternative block(s) again. If the zone No. of the origin of alternation is less than 0, it comes to be the error, and then the process is ended (i.e., the error end).

According to the present embodiment, since the writing of the data is performed by selecting the re-usable alternative block(s) of the alternation zone first when conducting the alternative Write, it is possible to use the restricted recording area with effectively. Also, when the zone of the origin of alternation locates in the zone at the most-outer periphery, since not the alternative block(s) in the most-internal zone, but the alternative block(s) in the zone just before the most-outer zone comes to be the alternative block, therefore, there is no necessity to turn the optical pickup from the most-outer periphery back to the most-inner periphery, thereby increasing transfer rate of the data, greatly.

Next, as an another embodiment according to the present invention, explanation will be given on the verifying operation (i.e., a verify control) after writing signals into the optical information recording medium which is constructed with a plurality of zones and differs in the sector numbers per one round of track for each zone, such as the DVD-RAM, etc.

In the DVD-RAM, the recording are of which is constructed with the plurality of the zones as mentioned above, the sector numbers are, as is also mentioned in the above, different from one another in the sector number per one round of the track for each of the zones. Further, when recording the information into the DVD-RAM, it is determined that the information is recorded by an unit of, so-called one (1) ECC block (=16 sectors). Accordingly, if it is determined the verify control is performed for each one of the 1 ECC blocks, much time (the sectors) must be taken for turning back to the starting position of the recording depending upon the zone in which the information is to be recorded. For example, comparing a case (case A) where the information of 1 ECC block (=16 sectors) is recorded in a zone including 40 sectors per one round of track, to a case (case B) where the information of 1 ECC block (=16 sectors) is recorded in a zone including 17 sectors per one round of track, assuming that the time necessary for jumping to a track being inside by one round of track is one (1) sector by converting it into sectors, then, 40−(16+1)=23 sectors are necessitated in the case A, while 17−(16+1)=0 sector is necessary in the case B, i.e., no time is necessary for turning back to starting position of recording in the case B. Then, according to the present embodiment, the block number for one verify control is changed depending upon the zones to be recorded with the information. By changing the block number for one verify control, the waiting time can shorten as short as possible, until the starting of the verify, thereby increasing the transfer rate for the data recording, greatly.

FIG. 16 shows an example of an exchange table for exchanging from "Write" to "Verify". Upon setting parameters of this exchange table, an exchange block number (a number of the remaining) being optimal to the sector number of each zone is assigned to each one of the zones, and the exchange block number per one sector is obtained by dividing the exchange block number by the block number of each zone.

For writing the information in the DVD-RAM, the data is once stored in a buffer memory, and then is derived into the next block a little by a little, wherein an intermittent signal processing is carried out so that the data is stored again when no stock is remained therein. Because of this, in the present embodiment, a recording capacity of the above buffer memory is determined upon setting up an upper limit in the exchange block number. According to the present embodiment, the block number of the above exchange block number is set at 8 blocks, however it should not be restricted only to this, but it can be determined appropriately by taking the capacity of the buffer memory into considerations.

According to the present embodiment, the parameters in the exchange table shown in FIG. 16 are set as follows. Assigning the exchange block numbers from "1 ) block" to "8 block" by changing for each one of the zones, a rotation waiting time for each zone is calculated. For calculating the rotation waiting time, a relationship of a calculation equation 1, i.e., "n=(16r+n)" is established, assuming that the sector number for each zone is t, the exchange block number r, the sector number of one (1) block 16r, a rotation waiting sector number x, the rotation waiting sector number per one (1) block x/r, and a track jump sector number n. By obtaining the n from the above calculation equation 1, there are obtained the rotation waiting sector number x with a calculation equation 2, as "x=nxt−16r−n", and the rotation waiting sector number per one block x/r with a calculation equation 3, as "x/r=(nxt−16r−n)/r". Calculating the rotation waiting sector number for each zone by using the calculation equation 3 mentioned above, the results shown in FIG. 16 are obtained.

From this result, the exchange block number at which the rotation waiting sector number comes to be the minimal for each zone is determined as an optimal exchange block number, thereby obtaining it as a table thereof in advance.

According to the present embodiment, since the Verify control is performed by determining the exchange block number to be the minimal in the rotation waiting sector number, it is possible to suppress the rotation waiting time to the minimal limit, and also to prevent from lowering in the performance due to the rotation waiting time as well.

Figure 17:
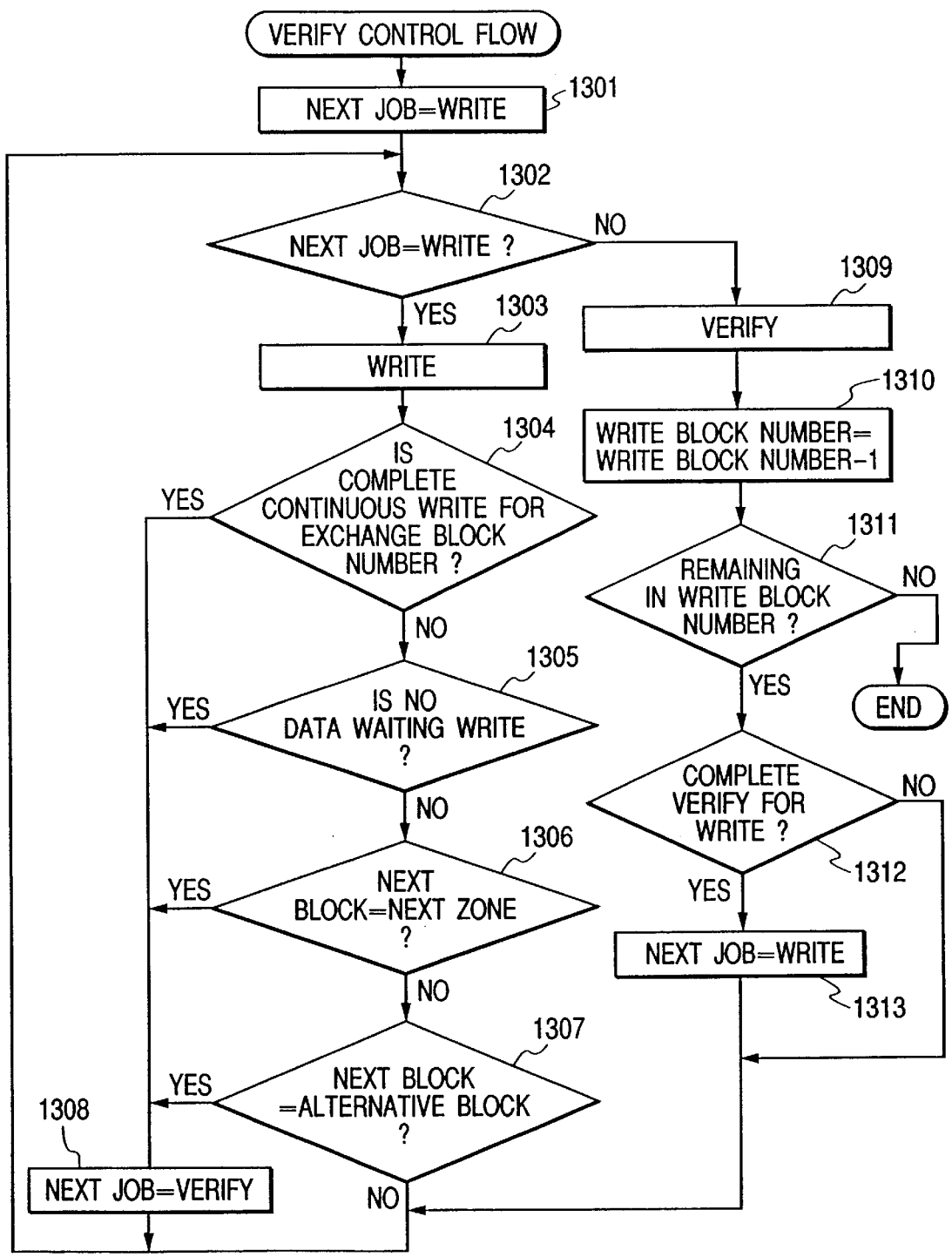
FIG. 17 is a flow chart of showing for Verify control for verifying the operation after writing of signals, in the recording/reproducing apparatus for optical information recording media according to the above present invention.

FIG. 17 shows a flow chart for controlling the verify operation (i.e., the Verify control) after writing signals. In FIG. 17, first a decision is made whether the next coming operation is the writing (Write) or not in a step 1302. If it is the Write, the step goes to a step 1303, and after conducting the Write, in a step 1304 is decided whether is "completed in continuous Writes for several exchange blocks from Write to Verify" or not. If it is "completed in Write", the process goes to a step 1308 to perform the Verify, and turns back to the step 1302 after completing the Verify operation, thereby performing the operations according to the flow chart.

If it is not "completed in Write", the step goes to a step 1305 to decide the presence of the data waiting the Write operation. If there is no data waiting the Write, the process goes to a step 1308 to perform the Verify, thereby completing the Verify of the block which has been done with the Write operation during the waiting of the Write data. The data which has been completed up to the Verify is released from the buffer memory so as to widen a vacant area in the buffer memory. Accordingly, even if the Write block number does not reach to the exchange block number, the Verify is conducted. In other words, the Verify is conducted during the waiting of the Write data, thereby obtaining effective processing in shortened time period. And it turns back to the step 1302 after completing the Verify.

If there is data waiting the Write, the step goes to a step 1306 to decide whether it is "next block=next zone" or not. If it is the "next block=next zone", the step goes to the step 1308 to perform the Verify, thereby completing the Write and the Verify within the said zone. Accordingly, the pickup, in more distinctive the irradiation position of the light thereof, does not need to move to the next zone nor return back to the original zone during the Write and Verify operations, thereby lessening the number in exchanging the zones and shortening the processing time period. It turns back to the step 1302 after completing the Verify, thereby performing the operations according to the flow chart.

If it is not the "next block=next zone", the step goes to a step 1307 to decide whether it is "having alternation assignment on said or next blocks" or not. If it is "having alternation assignment on said or next blocks", the process goes to the step 1308 to perform the Verify, thereby completing the Write and the Verify operations before moving the irradiation position of the light between the original block of the alternation and the destination block of the alternation repetitively. It turns back to the step 1302 after completing the Verify, thereby performing the operations according to the flow chart. If it is not "having alternation assignment on said or next blocks", it turns back to a step 1302, and then performs the operations according to the flow chart.

In the step 1302, if it is not the Write, the process proceeds to a step 1309 to made the verify (Verify), and then proceeds to a step 1310 after the Verify so as to turn to "Write block number=Write block number −1", and further proceeds to a step 1311 to decide whether there is "remaining in Write blocks". If there is "remaining in Write blocks", the process goes to a step 1312 to decide whether it is "completed in Verify of Write portion" or not. If it is "completed in Verify of Write portion", the process goes to a step 1313 to conduct the Write, and turns back to the step 1302 after completing the Write to perform the operations according to the flow chart.

If not "completed in Verify of Write portion", the process turns back to the step 1302 so as to perform the operations according to the flow chart.

As is explained or described in details in the above, in accordance with the present invention, the block number per 1 Verify control is changed depending upon the zones to be recorded with the information therein. By changing the block number per 1 Verify control, it is possible to minimize the time until the starting of the Verify, thereby improving the transfer rate for data recording greatly.

What is claimed is:

1. An information recording/reproducing apparatus for recording information by recording information of a plurality of sectors as one recording unit into an optical information recording medium, a recording area of the optical information recording medium including a plurality of zones, wherein each zone is different in a sector number per round of a track, comprising:

recording means for recording information of a plurality of sectors over a plurality of zones into the optical information recording medium; and conducting means for conducting a verify control;

wherein the recording and a timing of the conduction of the verify control are determined for each zone when the information of a plurality of sectors is to be recorded over the plurality of zones when the zone is changed over during the recording.

2. An information recording/reproducing apparatus for recording information by recording information of a plurality of sectors as one recording unit into an optical information recording medium, a recording area of the optical information recording medium including a plurality of zones, wherein each zone is different in a sector number per round of a track, comprising:

recording means for recording information of a plurality of sectors over a plurality of zones into the optical information recording medium; and conducting means for conducting a verify control;

wherein the recording and the verify control for destination sectors of alternation are conducted after the recording and the verify control for original sectors of the alternation are completed, in case that the information of a plurality sectors is to be recorded in the destination sectors of the alternation and the original sectors of the alternation.

* * * * *